(12) United States Patent
Wang (10) Patent No.: US 11,473,502 B2
(45) Date of Patent: Oct. 18, 2022

(54) OIL SYSTEM (71) Applicant: ROLLS-ROYCE plc, London (GB)

(72) Inventor: Yi Wang, Nottingham (GB)

(73) Assignee: ROLLS-ROYCE PLC, London (GB)

( * ) Notice: Subject to any disclaimer, the term of this patent is extended or adjusted under 35 U.S.C. 154(b) by 204 days.

(21) Appl. No.: 17/097,597

(22) Filed: Nov. 13, 2020

(65) Prior Publication Data
US 2021/0180515 A1 Jun. 17, 2021

(30) Foreign Application Priority Data

Dec. 11, 2019 (GB) ...................................... 1918189

(51) Int. Cl.
F02C 7/06 (2006.01)
F01D 25/20 (2006.01)
F01D 21/00 (2006.01)

(52) U.S. Cl.
CPC .............. *F02C 7/06* (2013.01); *F01D 21/003* (2013.01); *F01D 25/20* (2013.01); F05D 2260/98 (2013.01); F05D 2270/54 (2013.01)

(58) Field of Classification Search
CPC .......... F02C 7/06; F01D 25/18; F01D 21/003; F05D 2260/98; F05D 2270/54
See application file for complete search history.

(56) References Cited

U.S. PATENT DOCUMENTS

| 3,779,345 A | * | 12/1973 | Barnes | ...................... | F01M 1/18 60/39.08 |
| 4,284,174 A | * | 8/1981 | Salvana | .................. | F16C 19/52 60/39.08 |
| 5,097,926 A | * | 3/1992 | Duello | ....................... | F16N 7/32 184/6.26 |
| 5,911,678 A | * | 6/1999 | White | ..................... | F01D 25/18 60/39.08 |

(Continued)

FOREIGN PATENT DOCUMENTS

| GB | 2075134 A | * | 11/1981 | ............. | F01D 25/18 |
| GB | 2075134 A | | 11/1981 | | |
| GB | 2 093 373 A | | 9/1982 | | |

OTHER PUBLICATIONS

May 18, 2020 Search Report issued in British Patent Application No. 1918189.0.

(Continued)

*Primary Examiner* — Brian P Wolcott
*Assistant Examiner* — Joshua R Beebe
(74) *Attorney, Agent, or Firm* — Oliff PLC (57) ABSTRACT An oil system for a gas turbine engine and a method of supplying oil to the system. The oil system includes a main oil tank connected by oil lines with a supplementary oil storage tank, which has an actuator, and that are connected to one oil pump for supplying oil to the gas turbine engine. The supplementary oil storage tank is equal in size or larger than a steady state oil gulp of the system. The method includes supplying oil from a main oil tank through a pipe (Continued)

line using an oil pump, detecting the oil level in the oil system and determining if additional oil is required or requires removing using a sensor and an electronic controller, and transmitting a signal to an actuator to supply or remove oil to and from the pipe lines in the oil system from or into a supplementary oil storage tank.

16 Claims, 4 Drawing Sheets

(56) References Cited

U.S. PATENT DOCUMENTS 8,479,486 B2    7/2013   Angst

OTHER PUBLICATIONS

May 19, 2020 Office Action issued in British Patent Application No. 1918189.0.

May 3, 2021 Extended Search Report issued in European Patent Application No. 20207168.4.

* cited by examiner

OIL SYSTEM

FIELD OF THE DISCLOSURE

The present disclosure relates to an oil storage system. In particular the disclosure relates to a supplementary oil storage system, for example for use in a gas turbine engine.

BACKGROUND OF THE DISCLOSURE

In a typical oil system used in a gas turbine engine the oil is stored within the oil tank and lines. The oil is moved around the system via an oil feed pump that takes the oil from the oil tank and passes through a feed filter and into a heat exchanger before going to the desired part of the engine. It is removed from the engine via oil scavenge pumps and passes through a scavenge filter before returning to the oil tank. When the gas turbine engine is a turbofan engine, the oil tank and the oil pumps are typically positioned within the fan case.

The oil tank is typically sized to ensure that the minimum enclosed volume is equal to the sum of the following: the expansion space which is the required volume for the expansions of the oil; the usable oil volume, which is the amount of oil available for use by the engine during flight, allowing for transient go-around conditions and system priming; unusable oil volume which is part of the total volume of oil in the tank that is not available for engine oil consumption. The un-usable oil volume (VUNB) is also the result of the oil migration within the oil system due to filling of the pipe work, bearing chambers and changes in the engine power. This is made up of three elements: firstly, oil migration during engine start to idle (VSST)—this is also known as "steady state idle gulp"; secondly, oil migration during acceleration and take off (VTRA); and thirdly, low pressure oil (VLOW), which is where a volume of oil is required to prevent aerated oil from reaching the oil pump pressure element. As such, the unusable oil volume is defined as:

$$VUNB=VSST+VTRA+VLOW$$

Currently, the steady state idle gulp forms a sizeable portion of the oil tank volume. Furthermore, with advent of new engine designs there is becoming less space to contain the large oil tanks required for the engines. Additionally or alternatively, the new engines have a greater steady state idle gulp—an increase of ~45%; this therefore requires a large oil tank to store all of the oil. This therefore presents a technical problem that needs to be overcome.

SUMMARY OF THE DISCLOSURE

According to a first aspect there is provided an oil system for a gas turbine engine comprising a main oil tank; connected by oil lines with a supplementary oil storage tank which has an actuator, these are connected to at least one oil pump for supplying oil to the gas turbine engine; and wherein the supplementary oil storage tank is equal in size or larger than a steady state oil gulp of the oil system.

The actuator of the supplementary oil storage tank may be a piston.

The oil system may further comprise oil scavenge pumps may be driven by an electric motor.

The actuator of the supplementary oil storage tank may be controlled by an electronic controller.

The electronic controller may be an engine electronic controller of the gas turbine engine.

The supplementary oil storage tank may be positioned on a fan case in a conventional engine configuration or mounted within engine core, or in the front engine cavity anywhere the environment temperature is suitable for oil life.

The at least one pump may be connected to an associated oil filter.

According to a second aspect there is provided a method of supplying oil to the oil system of a gas turbine engine, the method comprising: supplying oil from a main oil tank through a pipe line using an oil pump; detecting the oil level in the oil system and determining if additional oil is required or requires removing using a sensor and an electronic controller; and transmitting a signal to an actuator to supply or remove oil to/from the pipe lines in the oil system from or into a supplementary oil storage tank.

The method may further comprise scavenging oil from the pipe line using oil scavenging pumps.

The method may further comprise filtering the oil in the lines proximate to the pumps.

According to a third aspect there is provided a gas turbine engine comprising the oil system as described above.

According to a fourth aspect there is provided a gas turbine engine having an oil system controlled by the method as descried above.

The gas turbine engine may be a geared gas turbine engine.

The term "steady state oil gulp" as used herein means the amount of oil needs to compensate oil migration during engine start to idle that will not come back to oil tank until engine shuts down.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other. Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform. The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 Nkg$^{-1}$ s, 105 Nkg$^{-1}$ s, 100 Nkg$^{-1}$ s, 95 Nkg$^{-1}$ s, 90 Nkg$^{-1}$ s, 85 Nkg$^{-1}$ s or 80 Nkg$^{-1}$ s. The specific thrust may be in an inclusive range bounded by any two of the values in the previous sentence (i.e. the values may form upper or lower bounds), for example in the range of from 80 Nkg$^{-1}$ s to 100 Nkg$^{-1}$ s, or 85 Nkg$^{-1}$ s to 95 Nkg$^{-1}$ s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number)

at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE FIGURES

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
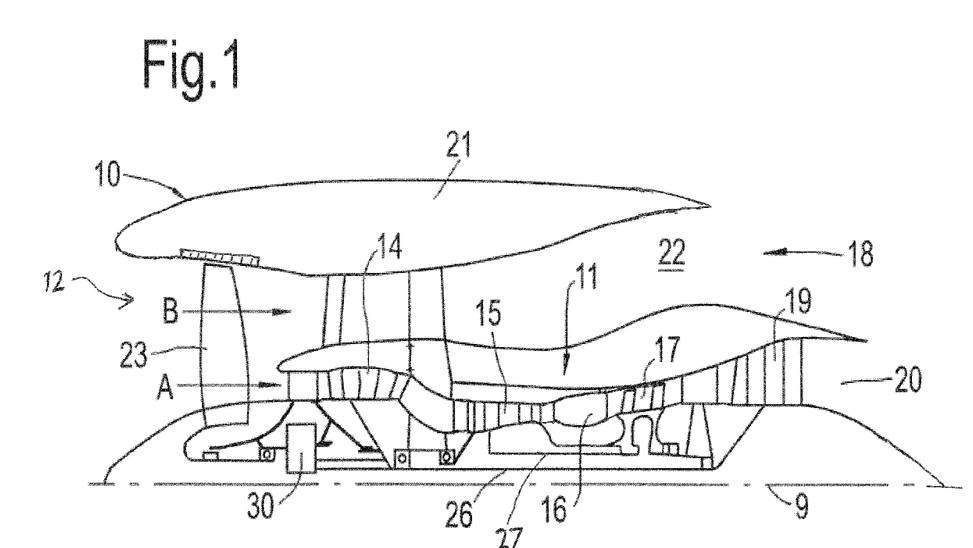
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
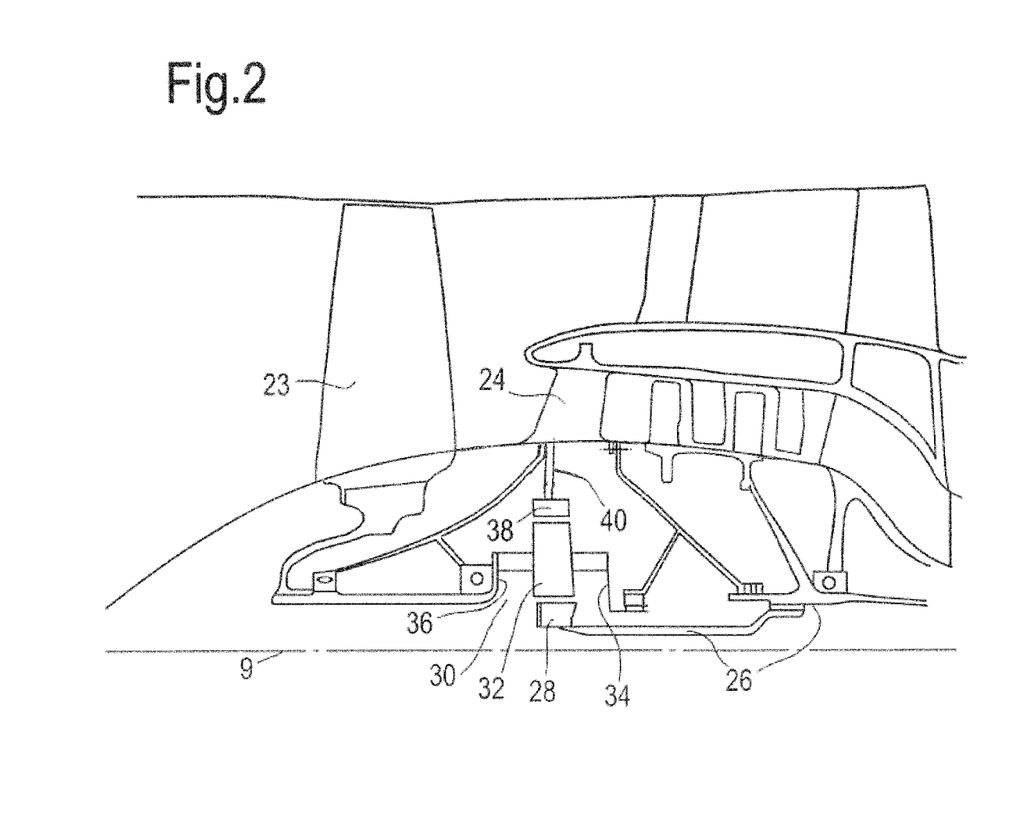
FIG. 2 is a close up sectional side view of an upstream portion of the gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
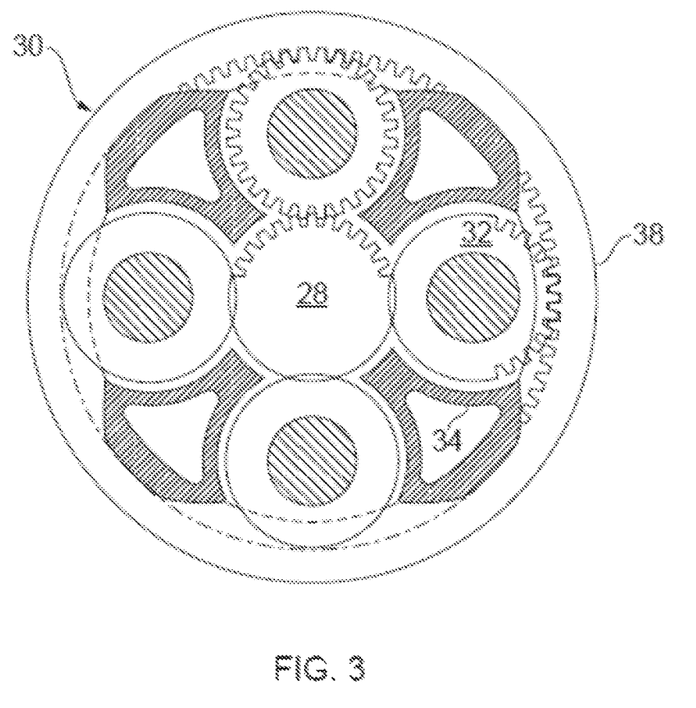
FIG. 3 is a partially cut-away view of a gearbox for the gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
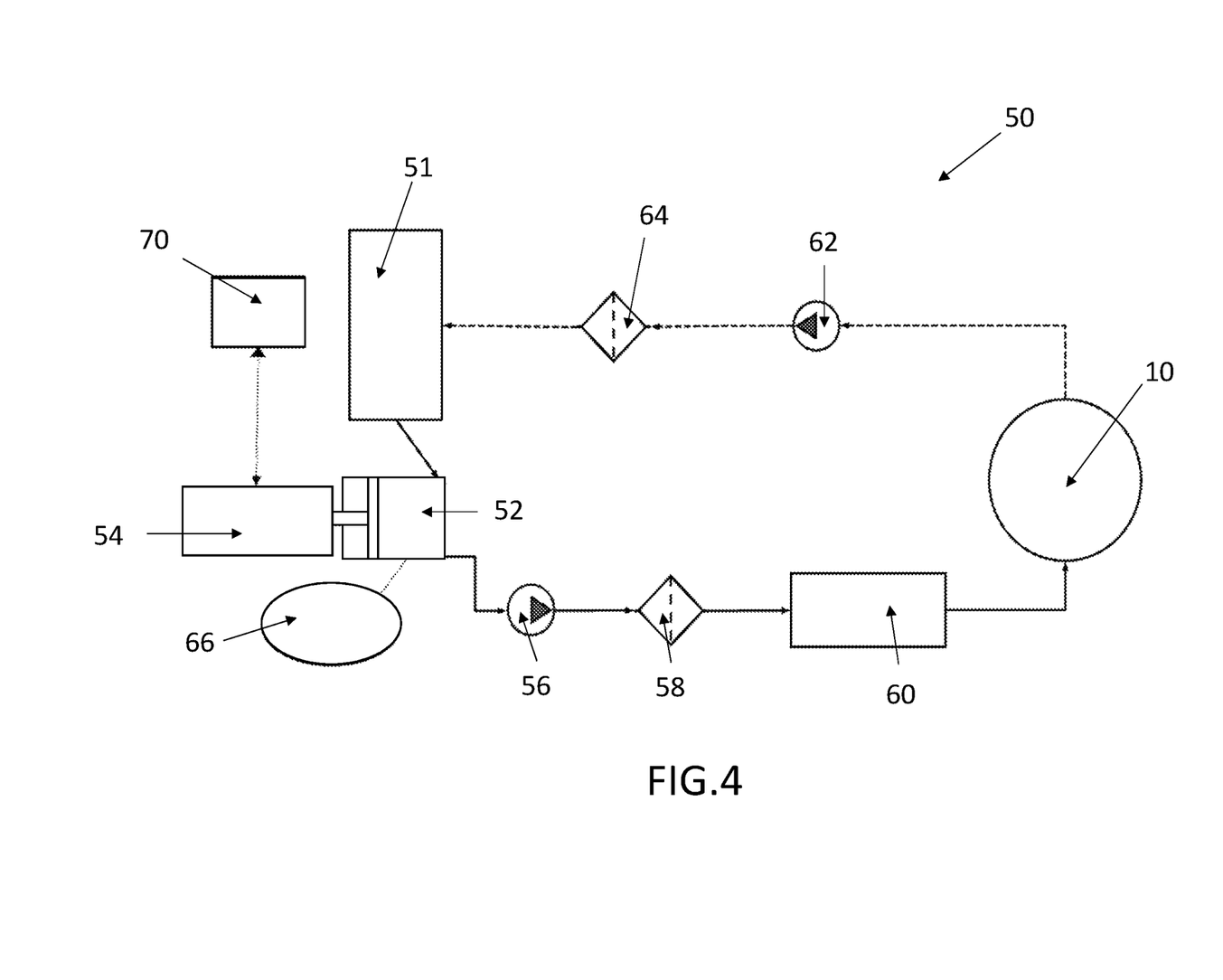
FIG. 4 is a schematic of the oil system of the disclosure.

FIG. 4 shows an example of the oil system 50 of the present disclosure. In this case the oil supplied from the main oil tank 51 passes through a supplementary oil storage tank 52 containing an actuator 54, which enables the variation of the volume of the supplementary oil storage tank 52 and consequently vary the volume of the oil in the system. The oil is driven around the system using an oil feed pump 56, preferably through an oil feed filter 58 that filters the oil, and into a heat exchanger 60. From the heat exchanger the oil passes through into the engine 10, before being removed using scavenge oil pumps 62 and passed through a scavenge oil filter 64 before going back into the main oil tank 51.

The supplementary oil storage tank 52 also has a sensor 66 positioned within it to detect the geometric variation of the supplementary oil storage tank 52, e.g., the position of the piston and hence the amount of oil in the oil tank 52.

The actuator 54 in the supplementary oil storage tank 52 is connected to an electronic controller 70. The actuator 54 may be any suitable actuator mechanism, such as a piston, or any other such actuator that would be apparent to the person skilled in the art. The supplementary oil storage tank is sized to have a maximum volume being the same amount of the steady state oil gulp and through use of the actuator its volume can be reduced to be a minimum that simply allows the oil to flow through and into the oil feed pump. The actuator 54 may be driven electrically, hydraulically, pneumatically or mechanically and may be controlled by a signal from electronic controller.

The electronic controller may be the engine electronic controller of the gas turbine engine. The electronic controller can be controlled by a signal from the sensor 66 within the supplementary oil storage tank 52. The oil is delivered to bearing chambers and gearboxes in the engine where the bearings and gears are housed for lubrication and cooling purposes.

The supplementary oil storage tank 52 can be located anywhere between the main oil tank 51 and the oil feed pump 56. Gas turbine engines are typically divided into zones and the supplementary oil storage tank 52 may be located within the same zone as the main oil tank 51, e.g., both within the fan case 21 or engine core 11 mounted. Alternatively, the supplementary oil storage tank 52 and the main oil tank 51 may be located in different zones, e.g., one within fan case 21 and another within engine core 11. The supplementary oil storage tank 52 may be mounted on the main oil tank 51. Alternatively, the supplementary oil storage tank may be mounted on the engine core 11. The supplementary oil storage tank may be integrated into the oil feed pump 56. In such a case it may share a housing with the oil feed pump 56. This may be beneficial for weight reduction. This also has the added effect of the supplementary oil storage tank 52 being able to share the drainage arrangement for the oil feed pump 56. The supplementary oil tank 52 can be filled as part of the normal filling process for the main oil tank 51. Multiple supplementary oil tank arrangement could be used and located in a distributed manner to suit small spaces that are not feasible in the conventional arrangement.

The method of controlling the oil in the oil system during engine operations may involve the following steps. Detecting the amount of oil in the oil system 50 and determining if additional oil is required or if there is too much oil in the system. Adjusting amount of the oil in the supplementary oil tank to compensate for the difference caused by different amounts of oil staying within the engine from different engine operations. A signal is transmitted to the actuator 54 instructing the actuator to reduce or increase the volume of oil in the supplementary oil tank. The actuator is then moved to increase or decrease the volume in the supplementary oil tank as appropriate. For example, during the start of the engine the engine electronic controller may instruct the actuator to reduce the volume of oil in the supplementary oil storage tank to a minimum. When the engine reaches a steady state idle the amount of in the oil system remains sufficient for the oil consumption during flight and accommodates the transient oil gulp. During engine shut down the engine electronic controller may instruct the actuator to increase the volume of supplementary oil storage tank to a maximum. The oil in the main oil tank before the engine starts is the oil that migrates during acceleration and take off, the usable oil and the low-pressure oil. The supplementary oil storage tank holds the volume of oil that migrates during engine start to idle—the steady state oil gulp. During the start up of the engine the oil in the supplementary oil storage is reduced and the oil in remaining part of the oil system increases. Once the engine has reached steady state ground idle there should be no or a minimum volume of oil remaining in the supplementary oil storage tank. During the engine shut down the volume of oil in the supplementary oil tank increases and begins to remove the volume of oil that was supplied for the steady state oil gulp. After the engine is shut down the oil in the main oil tank is the oil that migrates during acceleration and take off, the usable oil and the low-pressure oil. The supplementary oil storage tank holds the volume of oil for the steady state oil gulp.

This has the advantage that the main oil tank 51 can be smaller by the same amount as the steady state oil gulp, as this oil is now stored in the supplementary oil tank 52. This has the benefit of reducing the size of the main oil tank 51, which makes it easier to position the main oil tank 51 of reduced size within the engine. This has the additional benefit of the fact that the oil content reading of the main oil tank is not influenced by the steady state idle oil gulp. This therefore provides a more consistent monitor for the oil levels.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. An oil system for a gas turbine engine comprising:
    a main oil tank;
    a supplementary oil storage tank connected by oil lines to the main oil tank and having an actuator; and
    at least one oil pump connected to the supplementary oil storage tank and configured to supply oil to the gas turbine engine,
    wherein the supplementary oil storage tank is equal in size or larger than a steady state oil gulp of the oil system, the steady state oil gulp being an amount of oil needed to compensate for oil migration during the gas turbine engine start to idle that will not come back to the supplementary tank until the gas turbine engine shuts down, and
    the actuator of the supplementary oil storage tank is controlled by an electronic controller.

2. The oil system of claim 1, wherein the actuator of the supplementary oil storage tank is a piston.

3. The oil system of claim 1, further comprising at least one oil scavenger pump.

4. The oil system of claim 1, wherein the electronic controller is an engine electronic controller of the gas turbine engine.

5. The oil system of claim 1, wherein the supplementary oil storage tank is positioned within a fan case or engine core mounted or separated in different locations.

6. The oil system of claim 1, wherein the at least one pump is connected to an associated oil filter.

7. A gas turbine engine comprising the oil system of claim 1.

8. The gas turbine engine of claim 7, wherein the gas turbine engine is a geared gas turbine engine.

9. A method of supplying oil to an oil system of a gas turbine engine, the method comprising:
    supplying oil from a main oil tank through a pipe line using an oil pump;
    detecting an oil level in the oil system and determining if additional oil is required or requires removing using a sensor and an electronic controller; and
    transmitting a signal to an actuator of a supplementary oil storage tank to supply or remove oil to and from the pipe line in the oil system from or into the supplementary oil storage tank,
    wherein the supplementary oil storage tank is equal in size or larger than a steady state oil gulp of the oil system, the steady state oil gulp being an amount of oil needed to compensate for oil migration during the gas turbine engine start to idle that will not come back to the supplementary oil tank until the gas turbine engine shuts down, and
    the actuator of the supplementary oil storage tank is controlled by the electronic controller.

10. The method of claim 9, further comprising scavenging oil from the pipe line using at least one oil scavenging pump.

11. The method of claim 9, further comprising filtering the oil in the line proximate to the pump.

12. The method of claim 9, wherein the signal is transmitted by the electronic controller, and during the start of the gas turbine engine the electronic controller instructs the actuator to reduce a volume of oil in the supplementary oil storage tank to a minimum.

13. The method of claim 9, wherein the signal is transmitted by the electronic controller, and when the gas turbine engine reaches a steady state idle the amount of oil in the oil system remains sufficient for oil consumption during flight and accommodates a transient oil gulp.

14. The method of claim 9, wherein the signal is transmitted by the electronic controller, and during engine shut down the electronic controller instructs the actuator to increase a volume of oil in the supplementary oil storage tank to a maximum.

15. A gas turbine engine controlled by the method of claim 9.

16. The gas turbine engine of claim 15, wherein the gas turbine engine is a geared gas turbine engine.

* * * * *